Sept. 8, 1959     L. G. FISCHER ET AL     2,903,680

INTERCHANNEL RECEPTION SYSTEM

Filed Jan. 3, 1957

INVENTORS
LAURIN G. FISCHER, LEON HIMMEL,
AND ROBERT L. WHITTLE.
BY
ATTORNEYS

2,903,680

INTERCHANNEL RECEPTION SYSTEM

Laurin G. Fischer, Glen Rock, and Leon Himmel and Robert L. Whittle, Cedar Grove, N.J., assignors to the United States of America as represented by the Secretary of the Air Force Application January 3, 1957, Serial No. 632,404

5 Claims. (Cl. 340—213)

This invention relates to communication systems and more particularly to receiving systems for increasing the scope of information which may be monitored and improving the selectivity of interchannel reception of pulse type radio energy signals.

The present invention is particularly applicable to systems wherein a plurality of radio receivers, each tuned to a different reception frequency, are used for receiving pulse radio energy having different carrier frequencies. Structures of this kind may be found, for example, in radar monitoring systems for use with beacon responders having different transmitting frequencies. In such instances, it is usually desirable to obtain a separate visual indication of the pulse information for each receiver channel. A suitable indicator for this purpose may be a separate oscilloscope operating with each receiver. In a receiving system of this type, the addition of a new channel to monitor a new frequency requires the addition of a separate receiver and oscilloscope along with the associated circuitry.

Pursuant to the present invention, the number of new frequencies which may be monitored may be increased without increasing the number of oscilloscopes required. A new frequency between the operating frequency of each two specified channels may be monitored and indications received on the existing oscilloscopes of the two channels.

Accordingly, a primary object of the present invention is the provision of an arrangement for increasing the number of frequencies which may be monitored on existing indicators of a multiple channel receiving system.

Another object is the provision of an arrangement wherein two or more indicators, each operating with a receiver on separate channels may also provide indications from signals received on frequencies between those used in the separate channels.

A further object is the provision of an arrangement for improving the selectivity of interchannel reception.

And a still further object is the provision of an arrangement for increasing the scope of radio energy information which may be monitored by a multi-channel system.

These features, objects and advantages will become more apparent from the following description taken in connection with the accompanying drawings of a preferred embodiment of the invention and wherein.

Figure 1:
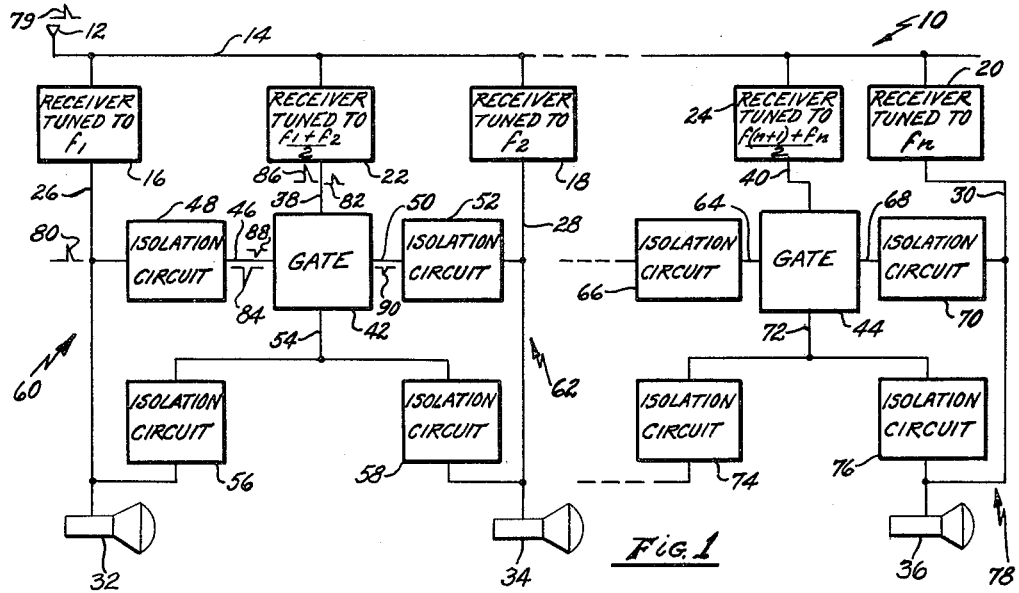
Fig. 1 is a block diagram of a preferred embodiment of the present invention.

Referring to Fig. 1 in more detail, a radio energy pulse receiving system made in accordance with the present invention is designated generally by the numeral 10. The receiving system 10 has an antenna 12 coupled through a radio energy transmission line 14 to a first plurality of radio receivers 16, 18 and 20 tuned to frequencies $f_1$, $f_2$, and $f_n$ respectively. While only three such receivers are shown in Fig. 1, a larger number may be used with the last being the receiver 20 tuned to the frequency $f_n$. The frequencies $f_1$, $f_2$ and $f_n$ are spaced sufficiently from each other and the selectivity of the individual receivers is such that signals at any of these frequencies are confined to the assigned channel.

The antenna 12 is also coupled through the line 14 to a second plurality of receivers 22 and 24, tuned to frequencies midway between the immediately adjacent receivers. Thus the receiver 22 is tuned to a frequency $$\frac{f_1+f_2}{2}$$

and the receiver 24 is tuned to a frequency $$\frac{f_{(n-1)}+f_n}{2}$$

where $(f_n-1)$ is the frequency of the receiver immediately preceding the receiver 24. The addition of these intermediate or second plurality receivers as 22 and 24 may reduce the frequency spread between adjoining channels to such a degree that signals of one channel frequency will appear not only in the assigned receiver, but also is the adjoining receivers as well. However, because of receiver selectivity, the signals will be greatly attenuated in adjoining receivers. For example, a signal having a frequency $f_1$ assigned to the receiver 16, would also appear in much attenuated form in the receiver 22. Despite such channel interference, the present invention succeeds in isolating the individual frequency signals as will become apparent as the description progresses.

The receivers 16, 18 and 20 are connected by lines 26, 28 and 30 to indicators 32, 34 and 36 respectively. The indicators 32, 34 and 36 may be conventional cathode ray tube arrangements as used in radar systems oscilloscopes or any other suitable type of indicators. The receivers 22 and 24 are connected by lines 38 and 40 to gate circuits 42 and 44 respectively. The gate circuit 42 is connected through a line 46 and an isolation circuit 48 to the line 26 leading to receiver 16. In similar manner, the gate circuit 42 is connected through another line 50 and isolation circuit 52 to the line 28 leading to the receiver 18. An output line 54 from the gate circuit 42 is also connected through another pair of isolation circuits 56 and 58 to the lines 26 and 28 respectively. The receiver 16 and indicator 32 with its associated circuitry may be considered as forming a channel 60. Similarly, the receiver 18 and indicator 34 combined with its circuits form a channel 62.

The receivers 24 and 20 are arranged with a gate 44 and indicator 36 in a manner similar to that described with respect to the channels 60 and 62. The gate 44 is connected through a line 64 and an isolation circuit 66 to a channel immediately preceding the receiver 24 which may, if desired, be the channel 62. The gate 44 is also connected through a line 68 and another isolation circuit 70 to the line 30 leading to the receiver 20. The gate 44 also has an output line 72 connected through a pair of isolation circuits 74 and 76 to the channel preceding the receiver 24 and to a channel 78 identified by the line 30, the receiver 20 and indicator 36 with its associated circuits. All of the isolation circuits as 48 and 56 may be amplifiers of conventional design as will appear from the following description.

In the operation of the receiving system 10, a pulse signal 79 having a carrier frequency $f_1$ picked up by the antenna 12 will be suitably detected and amplified by the receiver 16 so as to appear as a pulse 80 in the line 26 in channel 60. The pulse 80 will appear at the indicator 32 where it may be visually displayed in conventional manner as on a cathode ray tube.

Figure 3:
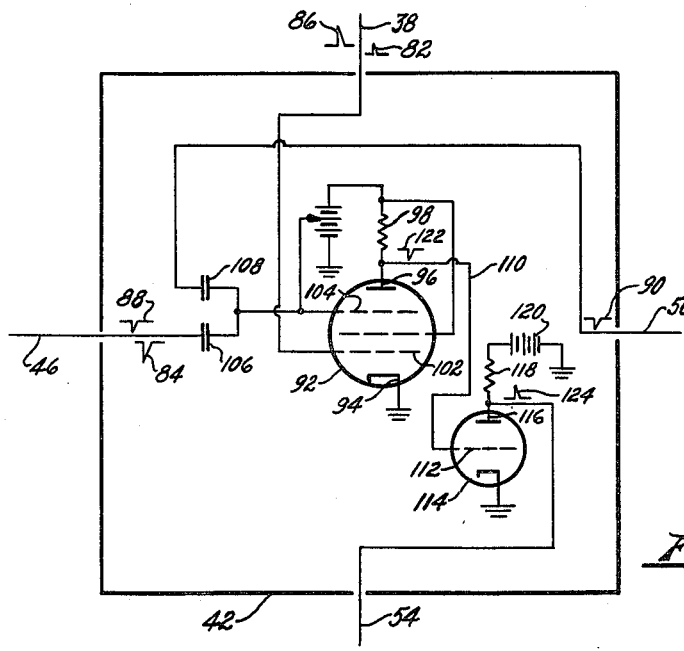
Fig. 3 is a schematic diagram of a circuit suitable for use as the gate circuit in the embodiment shown in Fig. 1.
Figure 2:
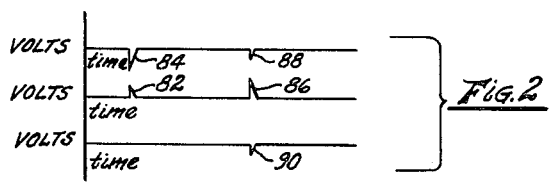
Fig. 2 is a voltage-time graph to more clearly illustrate operation of the embodiment shown in Fig. 1.

The pulse signal 79 picked up by the antenna 12 will also appear through the receiver 22 in the output line 38 as a pulse 82 (Figs. 1 and 2). Because of the selectivity of the receiver 22, as explained above, attenuation in the receiver 22 will cause the pulse 82 in line 38 to be much smaller than the pulse 80 in line 26. The pulse 80, in addition to appearing at the indicator 32 as explained above, will also appear through the isolation circuit 48 from which it emerges as a pulse 84 (Figs. 1 and 2) of reversed polarity and appears through line 46 at the gate 42. The gate 42, which will be described in further detail in connection with Fig. 3, is so designed that the negative pulse 84 blocks the passage of the pulse 82 through the gate 42. Therefore, the pulse 82 is prevented from reaching the indicators 32 or 34.

In similar manner, a pulse picked up by the antenna 12 and having a carrier frequency $f_2$ would be indicated on the indicator 34 and because of the isolation circuit 52, it would be blocked from passing the gate 42.

On the other hand, a pulse picked up by the antenna 12 and having a carrier frequency $$\frac{f_1+f_2}{2}$$

will appear through the receiver 22 in line 38 as a strong pulse 86 (Figs. 1 and 2) at gate 42. Because of attenuation in the receivers 16 and 18, the signal will appear as weak negative pulses 88 and 90 in lines 46 and 50 at the gate 42 respectively. The gate 42 is so designed that the weak negative pulses 88 and 90 do not block the passage of pulse 86. It will therefore appear through the line 54 and isolation circuits 56 and 58 at both indicators 32 and 34 respectively. The pulse 86 will thereby be displayed on both indicators 32 and 34 in similar manner to that described with respect to the pulse 80 on indicator 32.

In this manner it is noted that a signal received at the carrier frequency $f_1$ or $f_2$ will result in a display on one of the respective indicators 32 or 34; whereas, a signal at the carrier frequency $$\frac{f_1+f_2}{2}$$

is displayed simultaneously on both indicators 32 and 34. Likewise, in the additional channels, as channel 78, a signal received at a frequency such as $f_n$ will be displayed on a single indicator as an indicator 36, while a signal received at an intermediate frequency such as the frequency $$\frac{f_{(n-1)}+f_n}{2}$$

will be displayed on two indicators, those of the immediately adjoining channels. Therefore, by inserting the intermediate frequency receivers such as 22 and 24, together with the appropriate gate circuits, the range of frequencies which may be monitored by the receiving system is effectively increased.

A circuit suitable for use as the gate circuit 42 is shown schematically in Fig. 3. Referring to Fig. 3 in more detail, the gate circuit 42 has a coincidence electron tube 92 having a grounded cathode 94 and an anode 96 connected through a resistor 98 to the positive terminal of a power source such as a battery 100, the negative terminal of which is connected to ground. The coincidence tube 92 also has a control grid 102 connected to the line 38 of the receiver 22, and a suppressor grid 104 connected through a capacitor 106 to the line 46 and another capacitor 108 to the line 50. The anode 96 is also connected by a line 110 to a control grid 112 of a pulse inverter and amplifier electron tube 114. The electron tube 114 has an anode 116 connected through a resistor 118 to power source such as a battery 120.

The anode 116 is also connected to the output line 54 of the gate circuit 42.

In the operation of the gate circuit 42, the suppressor grid 104 is biased on the battery 100 to such a potential that the occurrence of a small pulse 82 through the line 38 at the control grid 102 simultaneously with the occurrence of a large negative pulse 84 through the line 46 or 50 to the suppressor grid 104, will not cause current to flow in the tube 92. On the other hand, the bias on the suppressor grid 104 is such that the occurrence of a large positive pulse 86 through the line 38 at the screen grid 102, despite a small negative pulse 88 through the line 46 and 90 through the line 50 at the suppressor grid 104, will nevertheless effect a pulse 122 in the line 110 leading to the control grid 112 of the tube 114. Thereby, a positive pulse 124 will appear at the anode 116 of the electronic tube 114 and at the output line 54 for operation of the receiving system, as explained above.

This invention is not limited to the specific details of construction and operation described as equivalents and will suggest themselves to those skilled in the art.

What is claimed is:

1. A radio energy receiving system comprising a first plurality of radio energy receiving means, each tuned to individualized frequencies, a separate indicator for each of the first plurality of receiving means coupled to the respective receiving means, a second plurality of receiving means, one receiving means of the second plurality for each pair of receiving means of the first plurality, each of the receiving means in the second plurality tuned to an individualized frequency midway between the frequencies of the corresponding pair of receiving means of the first plurality, voltage amplitude-differentiated gate means for each of the receiving means of the second plurality, said gate means being coupled to the respective receiving means of the second plurality and the adjacent receiving means of the first plurality in such manner that a signal having a frequency of the first plurality blocks any signal from the receiving means of the second plurality from reaching the indicator of the adjacent receiving means and passes a signal having a frequency of the second plurality for indication on the indicators of both adjacent receiving means.

2. A receiving system as in claim 1 wherein each indicator includes a cathode ray tube and each gate means includes an electronic gating tube and an amplifier in responsive relation to the adjacent receiving means for controlling the gating tube.

3. In a radio energy receiving system of the type having a plurality of receiving channels, each including a receiver tuned to a separate carrier frequency and an indicator for displaying signals received by the receiver, the combination of an additional receiver for each pair of channels tuned to a signal carrier frequency intermediate to that used in the pair of channels, and voltage amplitude-differentiated gate means for passing said intermediate frequency signals from said additional receiver to both channel indicators and blocking the passage of said separate carrier frequency signals from said additional receiver to said indicators.

4. In a radio energy receiving system of the type having a plurality of receiving channels, each including a receiver tuned to a separate carrier frequency and an indicator for displaying signals received by the receiver, the combination of an additional receiver for each pair of channels tuned to a signal carrier frequency intermediate to that used in the pair of channels, a voltage amplitude-differentiated gate circuit coupled to said additional receiver and indicators of both channels, and isolation circuit means in responsive relation to said channels and in control relation to said gate circuit for blocking passage of partially attenuated signals from said intermedate recever to said indicators.

5. A radio energy receiving system comprising a plurality of receiving channels, each including a receiver tuned to a separate carrier frequency and an indicator for displaying signals received by the receiver, said channels being paired with receivers tuned to separate frequencies, each outside the receiving range of the other receiver of the pair, a third receiver for each pair of channels tuned to a signal carrier frequency intermediate to that tuned to in the receivers of the pair of channels, a voltage amplitude-differentiated gate circuit coupled to said third receiver and the indicator of each of said channels in the pair, said electronic gate circuit including an electronic gating tube in the path of said third receiver and last-mentioned indicators, an amplifer coupled to each gating tube for biasing said tube to shut off in response to each signal in a channel of the pair caused by said separate carrier frequency.

References Cited in the file of this patent

UNITED STATES PATENTS

| | | |
|---|---|---|
| 2,553,271 | Peterson | May 15, 1951 |
| 2,586,894 | Williams et al. | Feb. 26, 1952 |
| 2,610,292 | Bond et al. | Sept. 9, 1952 |
| 2,725,467 | Atwood | Nov. 29, 1955 |